Feb. 25, 1930.  C. G. EDWARDS  1,748,642
COUNTER THRUST PRESSURE AIR COOLED MOTOR
Filed Aug. 14, 1929
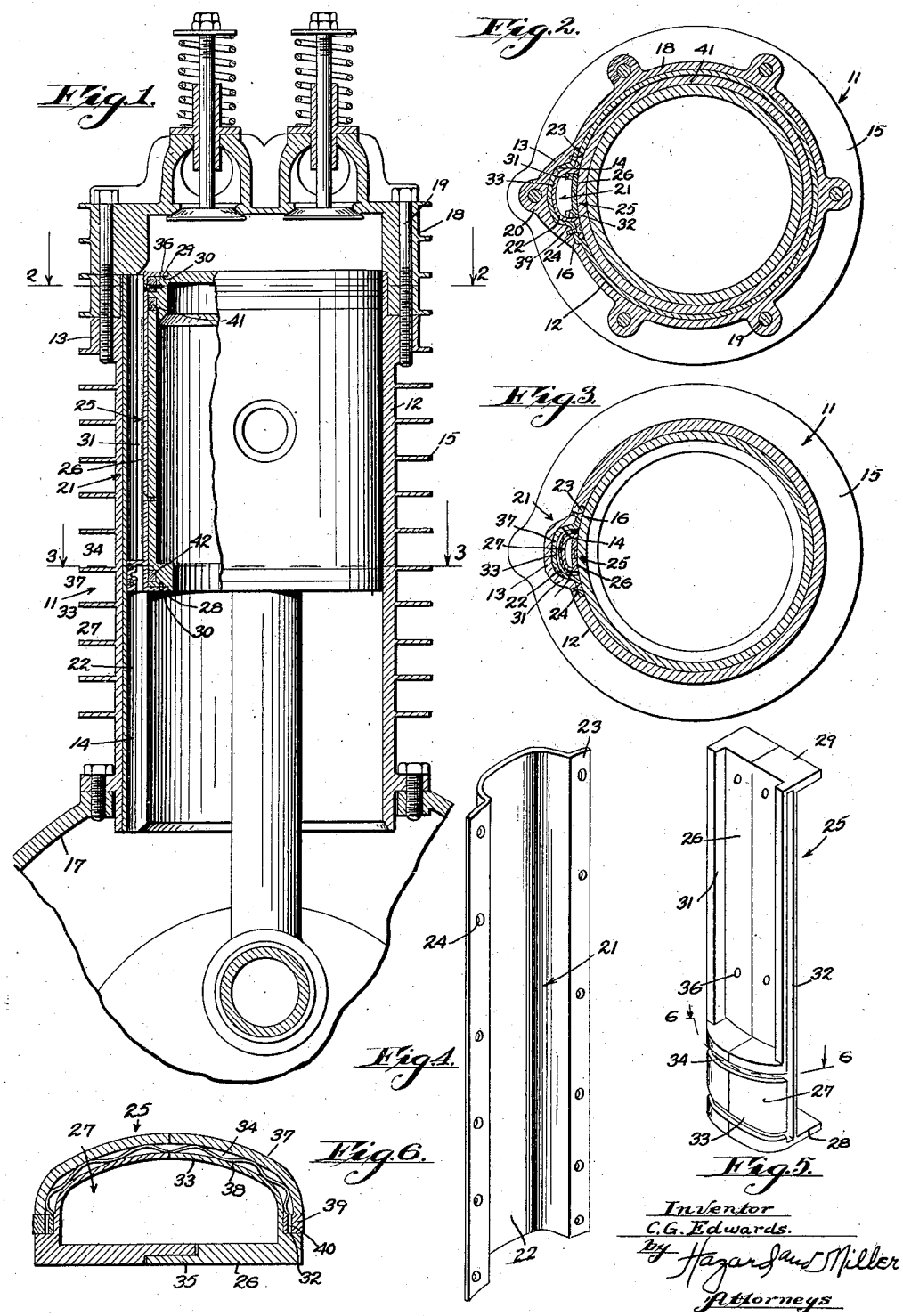

Patented Feb. 25, 1930

1,748,642

UNITED STATES PATENT OFFICE

CLARENCE G. EDWARDS, OF LOS ANGELES, CALIFORNIA

COUNTERTHRUST-PRESSURE AIR-COOLED MOTOR

Application filed August 14, 1929. Serial No. 385,935.

My invention is a counter-thrust pressure air cooled motor.

My invention pertains to a counter-thrust pressure motor, in which the gas from the explosion of an internal combustion engine gives a side thrust on the piston, counteracting the side thrust on the side of the cylinder due to the angular position of the connecting rod and the crank. Types of this engine are disclosed in my patent applications for U. S. Letters Patent, filed April 11, 1928, Serial No. 269,087 for counter thrust pressure motor and application Serial No. 378,514 filed July 15, 1929, for counter thrust pressure motor, also Patent No. 1,678,424, issued July 24, 1928, U. S. Patent No. 1,701,322, issued February 5, 1929, for counter thrust pressure motors.

An object of my present invention is the adaption of a construction suitable for the counter-thrust principle in air cooled motors, which may be utilized for engines of very light construction adapted for aeroplane and similar work.

An object of my present construction is making a cylinder of a metal block turned on the outside forming fins and having a longitudinal channel cut internally in the cylinder block or formed by molding and in which the wall of the cylinder conforms to the shape of the channel. With this channel I utilize a pressure resisting and wearing filler channel which is secured internally of the cylinder and when secured by screws or the like, the interior of the cylinder is turned to proper diameter. An object therefore of this construction is to make a cylinder of substantially uniform strength considered in a transverse direction with the channel on one side formed internally and with the external walls corresponding in thickness to the walls of the cylinder forming a longitudinal bulge on one side and with the filler channel secured in the cylinder, this filler channel adding strength to the cylinder as well as forming a wear resisting structure.

A further object of my invention is constructing the piston with a hanger on one side fitting in the channel. This hanger has a filling block at the lower end making a closure in the channel and with this hanger I feature expansion packing strips or partial rings which are forced outwardly, preferably by a wedge-shaped spring, thus giving a gas-tight seal against the filler channel by the rings on the filling block.

Another detail feature of my invention is having a longitudinal groove on opposite sides of the hanger on a projecting rim and with a straight compressing sealing strip mounted therein; this being pressed outwardly by a wedge type of spring.

Another feature of my invention is forming the hanger in two longitudinally joined parts, thus allowing taking up of wear.

My invention is illustrated in the accompanying drawings, in which,

Figure 1 is a vertical section through an engine, showing my invention with the piston shown in partial elevation;

Fig. 2 is a transverse section on the line 2—2 of Fig. 1 in the direction of the arrows;

Fig. 3 is a transverse section on the line 3—3 of Fig. 1 in the direction of the arrows;

Fig. 4 is a perspective view internally of the filler channel, fitting in the channel of the cylinder;

Fig. 5 is a perspective view of the hanger fitting on the piston;

Fig. 6 is an enlarged detail section on the line 6—6 of Fig. 5, through one of the compression rings in the filler block of the hanger.

In the construction illustrated I utilize a cylinder designated generally by the numeral 11 which has main walls 12 which are cylindrical and which has an outwardly extending bulge 13 at one side. Internally there is a channel 14 formed at the bulge. This may be formed in the casting of the cylinder block or may be machined out of the block. In this type of engine the exterior is preferably machined from a thick block, the fins 15 being formed in the machining operation.

In the construction of my cylinder it will be necessary to operate the turning tools to form the bulge 13 on the side of the cylinder. Internally of the cylinder there are two lateral depressions or recesses 16 on the margins of the channel. The cylinder is illustrated as bolted on a crank case 17 and having a removable head 18, the head being secured by bolts 19 passing through bosses 20 on the upper portion of the cylinder.

A filler channel 21 (note particularly Fig. 4) is formed of comparatively thin metal with a longitudinal channel structure 22 and with marginal flanges 23. These flanges are illustrated as having screw holes 24. The flanges fit in the recesses or grooves 16 and the channel portion 22 fits in the channel 14 of the cylinder. Screws or other fastenings are then used to attach the filler channel in the channel of the cylinder and the interior of the cylinder is then machined turning down the counter-sunk screws and also the flanges 23 of the filler channel. This makes a cylinder construction which instead of being weakened at the channel is actually stronger than the remaining portions of the cylinder, having the filler channel in addition to the metal forming the thickness of the cylinder at the main channel and a special insert is provided to take the wear due to the operation and of the hanger and the filling block operating in the channel.

The hanger 25 (note particularly Figs. 5 and 6) is formed with a vertical web section 26, a hollow filler block 27 at the bottom and bottom and top flanges 28 and 29. The vertical web section is made on a slight curvature as indicated in Figs. 2, 3 and 4, to conform to the cylindrical shape of the piston and the flanges 28 and 29 fit in recesses 30 in the bottom and top of the piston. At the margins of the web there are outwardly extending ribs 31, each of which ribs has a longitudinal groove 32 on the outside extending between the flanges 28 and 29. The filler block has an outwardly curved wall 33 fitting substantially the interior of the channel 22 and having compression ring grooves 34. The hanger is preferably split longitudinally with an overlapping joint as indicated at 35 (note Fig. 6) and may be secured to the piston by having screw holes 36 through which screws extend into the piston.

The ring grooves in the filling block are provided with compressing rings or strips 37, these being held outwardly by wave-like leaf springs 38, (sometimes designated as Marcel springs). The rings 37 are illustrated as abutting against the vertical compression strips 39, fitting in the grooves 32, these strips also being pressed outwardly by leaf-like wedge shaped springs 40. The construction illustrates two of the curved strips or rings 37 in the filling block and the straight compression strip 39 in each side of the hanger. The piston is illustrated as being provided with compression rings 41 and 42 which fit in grooves in the piston and pass behind the hanger.

With my construction, on reciprocation of the piston due to the exploding gases, these gases are driven with considerable force into the channel at the side of the cylinder, pressing the piston laterally. The effective compression packing by the compression strips on the filler block and on the ribs of the hammer, prevents leakage of the gases past the piston, giving a tight seal with the internal walls of the filler channel 21. Manifestly as this channel is removable, it may be replaced when worn to a sufficient extent to give an inefficient seal.

Various changes may be made in the principles of my invention without departing from the spirit thereof as set forth in the description, drawings and claims.

I claim:

1. An engine having a cylinder with a channel at one side, a filler strip fitting in said channel, and a piston having a filling block on one side to operate in the channel.

2. An engine having a cylinder with a channel at one side, a channel-shaped filler piece fitting internally of the said channel and secured on the inside of the cylinder and the piston having a filling block secured thereto, said block operating in the channel-shaped filler piece.

3. An engine having a cylinder with a channel on one side, a wear resisting filler piece mounted in said channel, and a piston having a hanger thereon with a filling block fitting in the channel.

4. An engine having a cylinder with a channel at one side, a wear resisting channel-shaped filler piece fitted internally of the said channel and having flanges, there being recesses in the cylinder to accommodate the said flanges, and a piston having a filler block operating in the said filler piece.

5. An engine having a cylinder, the cylinder wall being integral and having a channel-shaped wear resisting filler piece fitting in a channel of the cylinder and a filler block secured to the piston operating in the channel-shaped filler piece.

6. An engine having a cylinder with an integral wall and with a longitudinal channel at one side, a wear resisting channel-shaped filler piece fitting in the channel of the cylinder, a piston having a hanger with a filling block thereon, the said block operating with the channel-shaped filler piece.

7. An engine having a cylinder with a channel at one side and marginal depressions on opposite sides of the channel, a channel-shaped filler piece fitted in the said channel and having flanges fitting in the said depressions, means to secure the filler piece to the cylinder and a hanger secured to the piston having a filling block operated in the channel-shaped filler piece.

8. An engine having a cylinder with a longitudinal channel, a channel-shaped filler piece fitted internally of the said channel and secured to the cylinder, a hanger having a longitudinal split and secured to a piston, said hanger having a filling block operating in the channel-shaped filler piece.

9. An engine having a longitudinal channel, a piston having a filler block operating in said channel, having a groove with a compression packing strip mounted in the groove.

10. An engine having a cylinder with a longitudinal channel, a piston having a filler block with a transverse groove, a compression strip mounted in the groove and a spring in the groove thrusting the compression strip in close contact with the channel.

11. An engine having a longitudinal channel, a piston having a hanger with longitudinally extending ribs and a filling block, the ribs each having a groove with a packing strip fitting in the grooves and a wedge-like spring pressing the packing strips into engagement with the channel.

12. An engine as claimed in claim 11, the said filling block having a transverse groove with a curved compression strip fitting therein and pressed outwardly by a wave-like spring.

13. An engine having a cylinder with a longitudinal channel, a piston having a hanger with a longitudinal rib on each side and a filler block at the bottom, the hanger and the filler block being split longitudinally, the ribs each having a longitudinal groove with a packing strip fitted therein and outwardly pressed by a spring, the filler block having a transverse groove and the packing strip being pressed outwardly by a spring.

14. An engine as claimed in claim 13, the cylinder wall being formed integral and having the channel with the channel-shaped filler piece fitted internally therein, the filler piece being secured to the wall of the cylinder.

15. An engine having a cylinder with integral walls and fins extending thereabouts, the cylinder having a channel at one side with depressions on each side of the channel, a channel-shaped filler piece having flanges fitted in the depressions and attached thereto by screws fitted internally of the cylinder, a hanger having a filling block with a longitudinal split extending through the hanger and the filling block, the filling block operating in the channel of the filler piece.

16. An engine as claimed in claim 15, the hanger having a rib in each side with a groove in the rib extending into the margins of the filling block, a metallic packing strip in each groove pressed outwardly by a wedge-like spring in the groove, the filling block also having a transverse groove with a curved packing strip fitted therein and outwardly pressed into the channel by a wedge-like spring.

In testimony whereof I have signed my name to this specification.

CLARENCE G. EDWARDS.